US006921895B1

(12) United States Patent
Schieferdecker et al.

(10) Patent No.: US 6,921,895 B1
(45) Date of Patent: Jul. 26, 2005

(54) SENSOR MODULE WITH INTEGRATED SIGNAL PROCESSING

(75) Inventors: Jörg Schieferdecker, Wiesbaden (DE); Mischa Schulze, Hünstetten (DE)

(73) Assignee: PerkinElmer Optoelectronics GmbH, Weisbaden (DE)

( * ) Notice: Subject to any disclaimer, the term of this patent is extended or adjusted under 35 U.S.C. 154(b) by 0 days.

(21) Appl. No.: 09/914,083

(22) PCT Filed: Feb. 13, 1999

(86) PCT No.: PCT/EP99/01170

§ 371 (c)(1),
(2), (4) Date: Nov. 29, 2001

(87) PCT Pub. No.: WO00/50862

PCT Pub. Date: Aug. 31, 2000

(51) Int. Cl.$^7$ .................................................. G01J 5/20
(52) U.S. Cl. ............................. 250/252.1; 250/370.01
(58) Field of Search ....................... 250/252.1, 370.01, 250/370.15, 338.1, 339.09, 351.5, 353

(56) References Cited

U.S. PATENT DOCUMENTS 4,801,804 A  *  1/1989  Rosenthal .................. 250/341
4,803,360 A     2/1989  Ball et al. ................. 250/338.3

FOREIGN PATENT DOCUMENTS

| DE | 4331574 A1 | 3/1995 | |
| EP | 0845664 A1 | 6/1998 | |
| EP | 0 845 664  * | 6/1998 | ............. G01J/5/20 |

* cited by examiner

Primary Examiner—Otilia Gabor
(74) Attorney, Agent, or Firm—Perman & Green, LLP.

(57) ABSTRACT

A sensor module comprises a radiation-sensitive sensor element (12), a sensor signal processing circuit (13, 41$a$, 44$a$) receiving the output signal of the sensor element (12) and obtaining a radiation-dependent first electric signal therefrom, a temperature-sensitive reference means (14, 15, 41$b$, 43, 44$b$) providing a temperature-dependent second electric signal and a signal combining means (16) for combining the two electric signals. The sensor signal processing circuit (13, 41$a$, 44$a$), the reference means (14, 15, 41$b$, 44$b$) and the combining means (16) are formed on a single chip (20, 21), and the chip (20, 21) and the sensor element (12) are accommodated in a common housing (22, 62, 64).

16 Claims, 8 Drawing Sheets

SENSOR MODULE WITH INTEGRATED SIGNAL PROCESSING

This application claims the benefit of the earlier filed International Application No. PCT/EP99/01170, International Filing Date, 23 Feb. 1999, which designated the United States of America, and which international application was published under PCT Article 21(2) in German as WO Publication No. WO 00/50862.

BACKGROUND OF THE INVENTION

1. Field of the Invention

The present invention relates to a sensor module according to the preamble of claim 1. Such a sensor module is known from the DE 43 31 574 A1. The invention relates to an infrared sensor module particularly applicable to cooking, baking and heating apparatuses, for example in microwave ovens.

2. Brief Description of Related Developments

Figure 1:
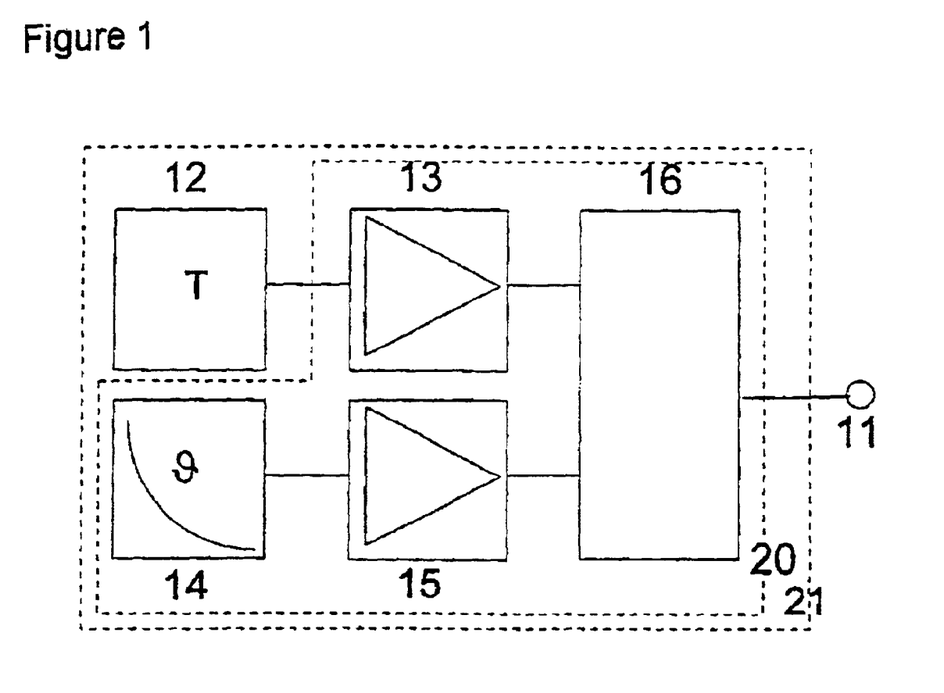
FIG. 1 shows a known circuit.

FIG. 1 is a schematic block diagram as described in the above state of the art. 12 denotes the actual sensor element which is radiation-sensitive and outputs an electric signal to its clamps when electromagnetic radiation is incident. It may, for example, be a thermocouple. An amplifier 13 amplifies the electric signal of the sensor element. For balancing physically induced influences of the ambient temperature on the output signal of the sensor element, a reference means (14, 15) is further provided which is also temperature-sensitive. 14 denotes a temperature reference sensor, preferably a thermal resistor provided near the sensor and changing its parameters in accordance with its temperature. 15 denotes an amplifier or impedance converter converting said change into a usable electric signal which, combined with the amplified signal of the sensor element, reduces the influence of the ambient temperature on the signal from the radiation sensor. 16 denotes a different amplifier obtaining the difference between the signals from the radiation senor (12, 13) and the temperature sensor (14, 15) and outputting an approximately ambient temperature-compensated and object temperature-dependent output signal 11.

The known circuit has various disadvantages: The temperature compensation acts optimally only for a relatively small ambient temperature range since the characteristics of known miniaturised temperature reference elements are typically linear or exponential while a dependence with about the $4^{th}$ power has proved particularly favourable. The signal amplification and processing are provided on a circuit board outside of the transistor housing in which the sensor chip and the temperature reference sensor are disposed. Since the sensor module is comparably large, space problems may occur in the integration in appliances. Above that the construction with the signal processing outside the metallic sensor housing may also lead to a falsification of the signal by electromagnetic interferences. This influence needs to be eliminated by expensive and complicated shielding measures or a subsequent signal processing.

It is the object of the invention to provide a sensor module capable of outputting an accurately temperature-compensated output signal corresponding to the temperature of an object. Said object is solved by the features of claim 1. The dependent claims are directed to preferred embodiments of the invention.

SUMMARY OF THE INVENTION

A sensor according to the invention comprises a radiation-sensitive sensor element, a sensor signal processing circuit, temperature-sensitive reference means, a signal combining means and, if required, different means for parameter adjustment and calibration. The sensor signal processing circuit, the reference means and the signal combining means are formed on a single chip (an application specific integrated circuit). The chip for the sensor signal processing and the sensor element are accommodated in a common housing. In addition, the sensor element may be disposed on a single chip together with the sensor signal processing circuit, the reference means and the signal combining means.

The housing is preferably relatively small. It may, for example, be a commercially available TO5 or TO18 housing. In a certain cutting plane it may be formed so that no dimension of the cross section is larger than 12 mm. It may be a cylindrical housing the diameter of the cylinder being no larger than 9 mm.

The reference means serves to compensate the temperature path of the sensor element. Since the temperature path of the sensor element is generally non-linear, its temperature path can only unsatisfactory be simulated by a linear reference means. It has been found that an exponential function is suitable for simulating the temperature path of the sensor element over narrow ranges and that a power function is suitable for simulating the temperature path of the sensor element over wide ranges. In particular a square or power function of higher order may be used to evaluate the signal generated depending on the radiation sensor and to optimally simulate the temperature path of the sensor element. A $4^{th}$ order power function has been proved to be the preferable function for an optimum compensation of the temperature path of the sensor element.

The signal combining means may be provided with an adder or subtractor, particularly a integrator amplifier or a differential amplifier. The selection of one of said means is effected depending on a qualitative comparison of the temperature path of the sensor element on the one hand and the temperature path of the reference means on the other as well as further depending on possibly effected sign evaluations. If the temperature path of the reference means and the sensor element itself are, for example, parallel (if, for example, both output signals drop with the temperature increasing), a differential amplifier may be used, when no further sign evaluation of the signals is effected. If one of the signals, for example the one form the reference means, is negatively validated (for example, by the impedance converter), a integrator amplifier may be used.

The signal of the sensor element is not only influenced by the ambient temperature but also by the allowances and the power dissipation of the circuit. Therefore a compensation means for compensating the power dissipation of the ASICs as well as calibration means for reducing the influence of allowances and offsets may be provided.

For setting or adjusting the sensor for different conditions a preferably digital programming means may also be provided in the housing by which the analogous or digital parameters of the sensor can be adjusted or changed.

BRIEF DESCRIPTION OF THE DRAWINGS

Individual embodiments of the invention will be described below with reference to the drawings in which.

DETAILED DESCRIPTION OF THE PREFERRED EMBODIMENT(S)

FIGS. 2a–f are schematic top views of the designs of sensors according to the invention. In the illustrations the same numerals as used in FIG. 1 specify identical components. 20 denotes an integrated circuit comprising at least the components 13 to 16 of FIG. 1. It may be an ASIC. Separate from the integrated circuit 20 the sensor element 12 is provided which may be connected to the integrated circuit 20 via bonding connections. Via further bonding connections the integrated circuit 20 is connected to the external terminals 11.

Figure 2:
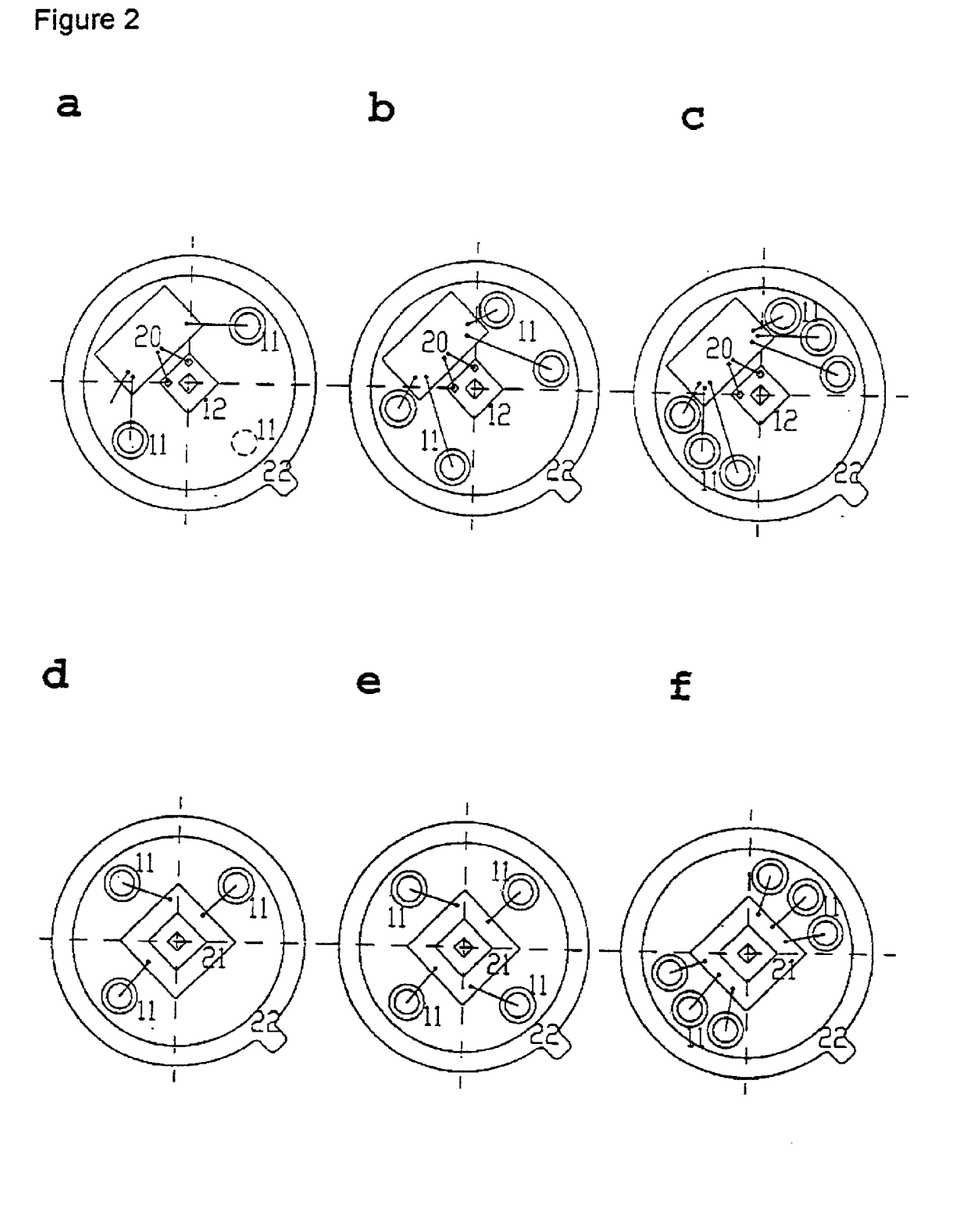
FIGS. 2a–f show embodiments of the invention.

The construction according to FIGS. 2a–c is hybrid in so far as the sensor element 12 is provided independent of the integrated circuit 20. Different possible connections are illustrated. FIGS. 2d–f show designs in which the sensor element is provided on the integrated circuit 21 itself. In this case also the connection to the terminals 11 is effected via bonding connections. Different possible connections are shown which will be described later.

22 denotes a schematic illustration of the bottom plate of a cylindrical housing having a diameter of maximally 10 mm. In this housing the integrated circuit 20 (the sensor signal processing circuit, the reference means, the signal combining means) as well as the sensor element 12 itself are accommodated in a hybrid construction or together on one chip 21.

Figure 3:
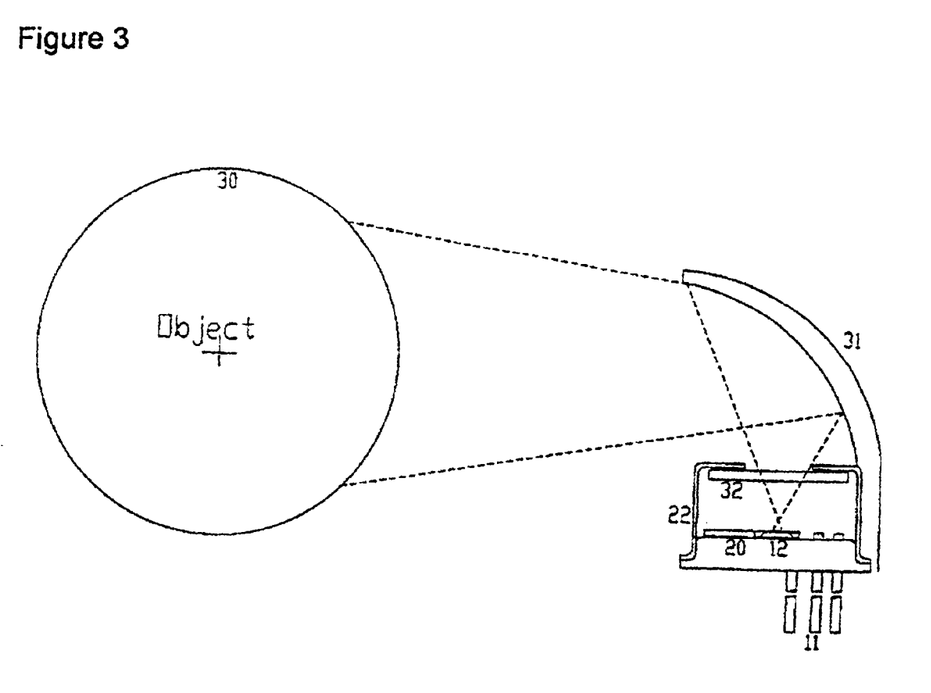
FIG. 3 is a cross sectional view of a sensor according to the invention including an optical imaging means.

FIG. 3 shows a cross section of a sensor according to the invention having a hybrid construction. The sensor is designed to detect electromagnetic radiation, particularly infrared radiation, from an object 30. It is provided with an optical imaging or collecting element 31 attached on the outside which forms an image of the radiation emitted by the object 30 on the sensor element 12 inside the sensor or collects it there.

The housing 22 is preferably closed on all sides. It is provided with a window 32 for the passage of the radiation, said window being transmissible for at least the relevant wave length range of the electromagnetic radiation. It may further be at least partly intransmissible, in which case it fulfils the function of a filter. The housing may otherwise be formed so as to be radiation-shielding, for example by forming the walls and bottom of an electrically conductive material and by making the window partly electrically conductive or semi-conductive.

Figure 4:
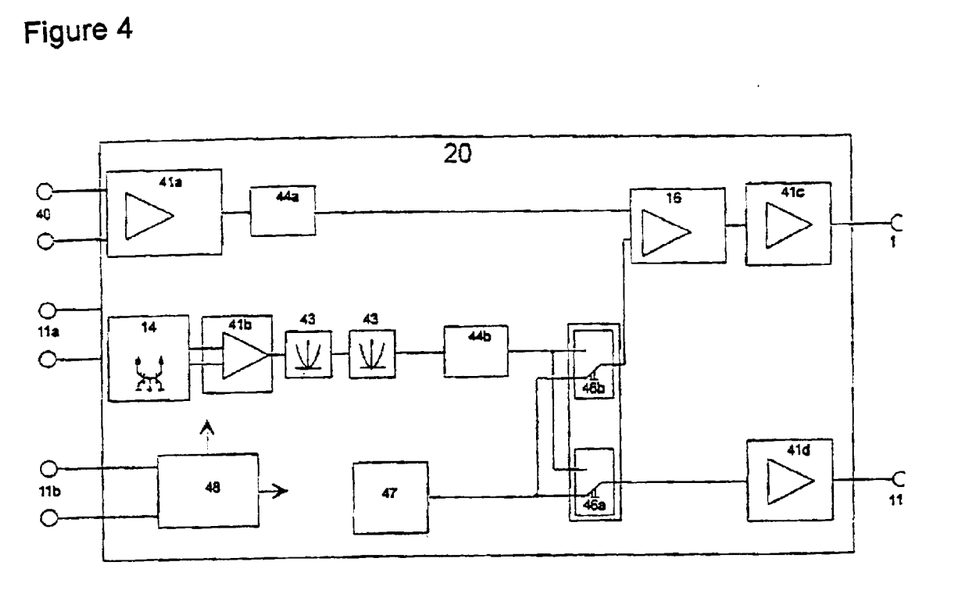
FIG. 4 shows a circuit design according to the invention.

FIG. 4 is a block diagram of an embodiment of a circuit 20 according to the invention. 20 denotes the ASIC shown in FIG. 2a. The illustrated components are thus provided as an integrated circuit on a chip. 40 denotes the terminals through which the signal of the sensor element is received. 41a denotes a preamplifier or only an impedance converter preferably provided with calibration means. 44a denotes an offset correction. Parallel to the described branch another branch extends. It is provided with a entry side reference element 14. The reference element is thermally coupled to the sensor and supplies a signal corresponding to the temperature of the sensor, preferably in linear dependence. 41b denotes another preamplifier or impedance converter.

43 denotes elements for the characteristics simulation. They simulate as accurately as possible the temperature characteristic of the sensor element on the clamps 40 in a certain temperature range. It has been found that the temperature path of the sensor element 12 is non-linear (at the clamp 40). In so far the temperature path can only partly be simulated accurately by a linear temperature sensor element 14. The Simulation 43 may therefore be an exponential function for narrow temperature ranges or a power function. Second or fourth order power functions are preferable. The square function is generated from a signal from the temperature reference element by a squaring circuit 43, said signal being linearly dependent on the temperature. The series connection of two squaring units 43 results in a $4^{th}$ order power function. 44b denotes an additive offset correction. 46a and 46b denote change-over switches the purpose of which will be described later. 16 denotes the combining means. It may be formed as a integrator amplifier in which the degree of amplification can be programmed. It may be an embodiment in which the temperature path of the temperature sensor element 14 is opposed to the one of the actual sensor element 12 or in which the temperature paths are identical but a sign change is effected, for example, in the reference branch.

41c may be a filter circuit or a sample-and-hold circuit to generate a band-limited or temporally continuous output signal which may be coupled out with low impedance. At the output 11c, finally, the signal corresponding to the electromagnetic radiation to be detected may be received in a temperature compensated state.

The change-over switch 46b may be used to select whether the sensor signal is to be output in a temperature compensated state (upper switch position) or in a non-compensated state (lower switch position). In the latter case, preferably, a reference voltage source 47 is connected with the input of the integrator amplifier otherwise occupied by the temperature reverence voltage to keep the integrator amplifier on a defined potential. With the change-over switch 46a a temperature signal (upper switch position) or a reference voltage signal (lower switch position) may be selectively applied to another filter switch or sample-and-hold switch 41d so that the corresponding signals may be tapped at the output 11d.

A compensation means may be provided to compensate the influence of the power dissipation of the described electronic components. The power dissipation results in a heating of the electronic components influencing the output signal of the sensor element. With the mentioned compensation means this can be prevented. Since the power dissipation of the electronic circuit on the chip can be approximated to a constant value it may be compensated by an appropriate adjustment of the offset compensation 44a.

In another embodiment a preferably digital programming means 48 may be provided. It is accessible from the outside via the terminals 11b and may serve to set system parameters. With the programming means 48 amplification factors of the amplifiers 41a, 41b, 16, offset voltages of the components 44a, 44b, switch positions of the switches 46a, 46b, the reference voltage 47, parameters of the simulations 43, filter coefficients of the circuits 41c, 41d and the like may be set. They may be set in a fixed way (for example by integrated securing means) or in a variable way (for example by means of rewritable memories) and are in both cases programmable by access via external terminals.

The programming means 48 may also be designed for the purpose of setting or changing the allocation of electric terminals, 11, 11a–d to electronic components of the sensor. In this way external terminals 11 may be saved. The programming means 48 may have a single terminal or two terminals which may be provided in addition to the other (preferably analogous) terminals. It may receive temporally serial signals. The terminals may also be used bidirectionally. The circuit is preferably provided with three to six terminals 11. FIGS. 2a and 2d show embodiments with three terminals which may, for example, be supply voltage, mass and output signal terminal. In such an embodiment the terminals may also be variably occupied. Switching may, for example, be effected by means of the supply voltage modulated with a change signal. FIGS. 2b and 2e show embodiments with four terminals, for example, mass, supply voltage, output signal and analogous or digital control input. FIGS. 2c and 2f show embodiments provided with six terminals (for example mass, supply voltage, compensated output signal, control input, linear temperature output, threshold monitoring output).

The amplification of the amplifiers 41a and 16 may be set so that characteristic value tolerances of the sensor element 12 and the sensor signal processing are balanced by the amplification of the amplifier 41a while the sensor output signal can be adjusted to the desired value range by the amplification of the amplifier 16.

The output voltages of the sensor may, for example, be set in a range from 0 to 5 V or in a range from 0 to 3 V. The temperature compensation is preferably selected so that an optimum sensor signal compensation is obtained in an ambient temperature range from −20° C. to 100° C. The terminals 11a preferably serve the voltage supply of the sensor module.

Figure 5:
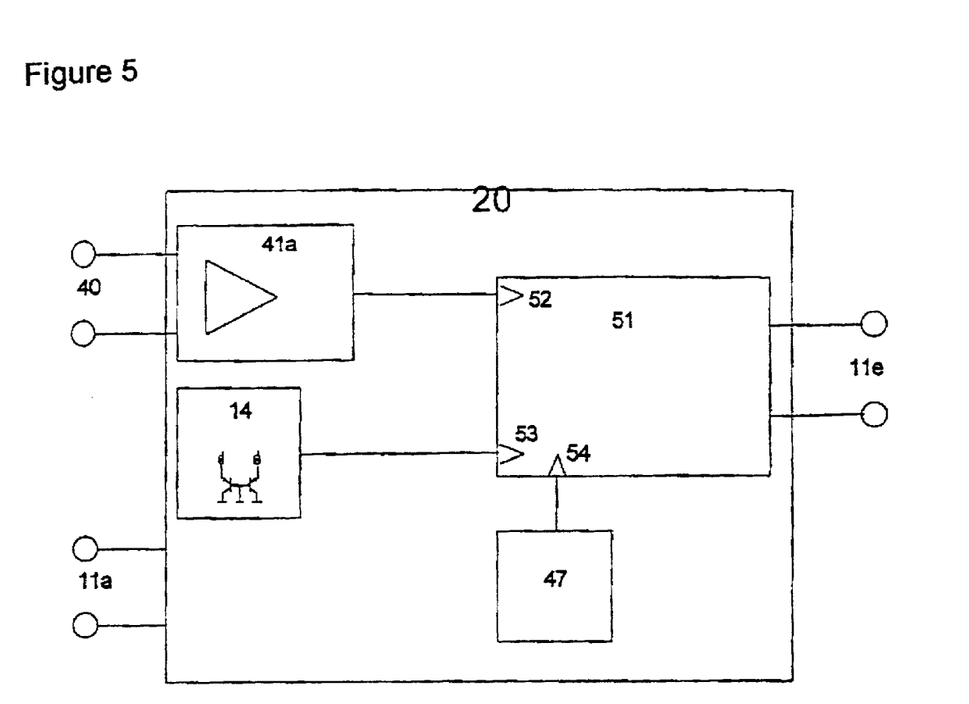
FIG. 5 shows another circuit design according to the invention.

FIG. 5 shows another embodiment of the invention in which a mainly digital signal processing is performed. Like in FIG. 4, 40 denotes the terminals for the sensor element 12. 11a denotes the voltage supply terminals. An yet analogous signal from the preamplifier or impedance converter 41a preferably comprising a calibration means arrives at a digital circuit 51 (a micro controller). It comprises input side A/D converters 52 to 54 receiving analogous signals from the input amplifier 41a, from the temperature reference element 14 and from the constant voltage source 47. The other components of FIG. 4 are replaced by digital devices.

The characteristics simulation 43 may be replaced by a formula or a table allocating specific output values to the input values. The output signals may also be output digitally via one or more terminals 11e. Then, for example, the uncompensated radiation sensor signal, the temperature signal, the compensated radiation sensor signal and the reference voltage signal may be successively transmitted. Depending on the kind of application of the sensor a threshold inquiry may also be implemented which results in a YES/NO signal a being output for a threshold value to be monitored. If a plurality of threshold values are monitored, correspondingly a plurality of such signals may be output in parallel or successively.

The voltage reference 47 may, for example, be formed as a band gap voltage reference circuit or it may comprise a Zener diode. The temperature reference element 14 may be formed as a PTAT sensor.

Figure 6A:
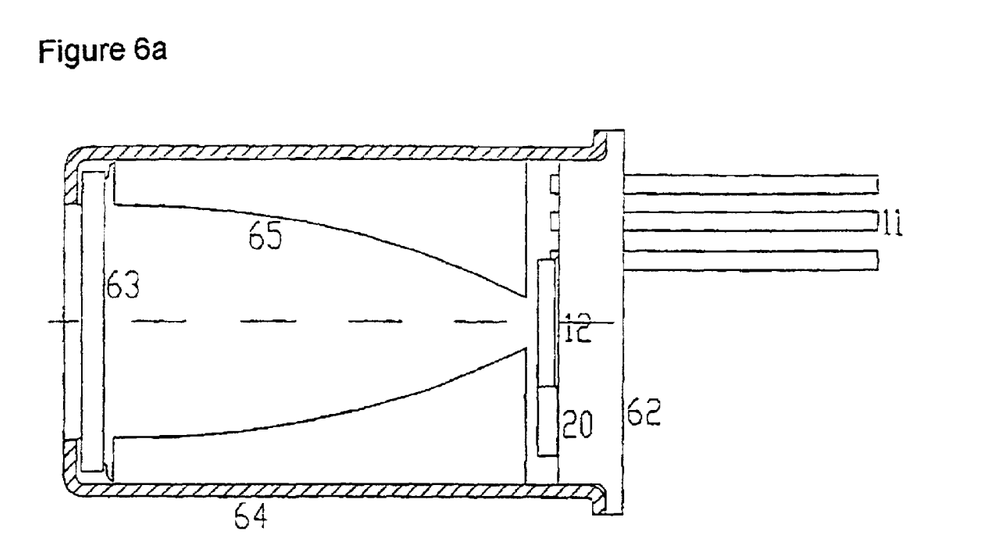
FIGS. 6a–c are further cross sectional views of a sensor according to the invention including an optical imaging device.
Figure 6B:
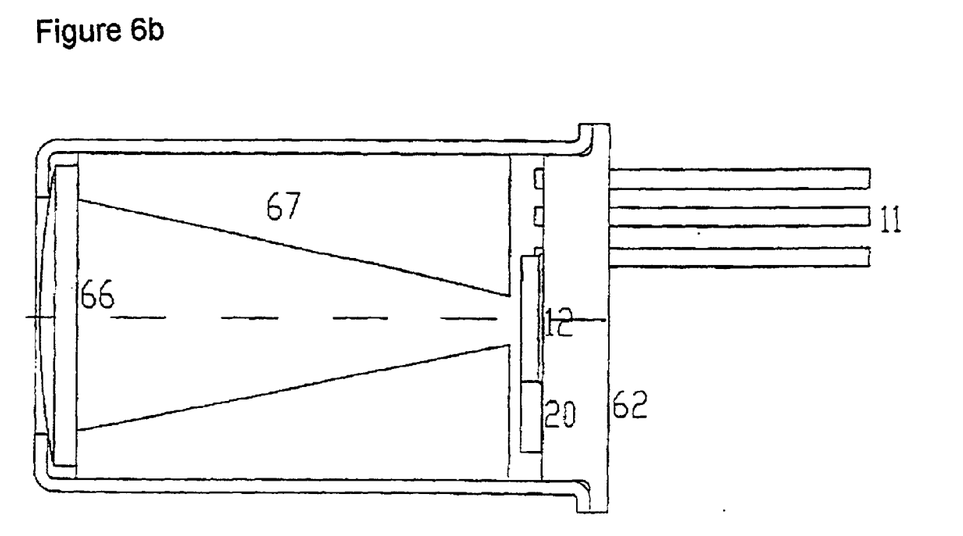
Figure 6C:
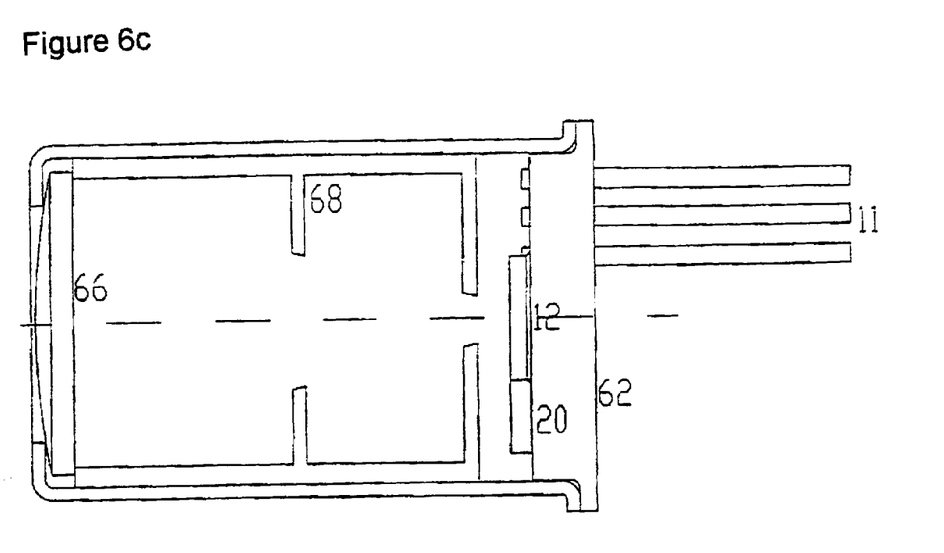

Further embodiments of the invention are shown in FIGS. 6a–c. They are schematic cross sectional views of a housing of the design TO5 or a smaller housing, for example a TO18. It has a cylindrical shape and comprises a bottom plate 62 through which the terminals 11 are lead to the outside. On the bottom plate 62 the actual sensor element 12 as well as the integrated circuit 20 are disposed. The housing is sealed. The sealing 64, 62 may be composed of a metallic material to shield off electromagnetic disturbances. In the housing wall a window 63 is provided which is transmissible for at least the relevant wave length range of the electromagnetic radiation. Above that the window 63 may be conductive or semi-conductive or have a conductive or semi-conductive coating to shield off electro-magnetic radiation. The window 63 is preferably provided in the upper face of a cylindrical housing. Inside the housing an imaging or beam guide means 65 is provided. In the illustrated embodiment it is, for example, a rotationally symmetric parabolic mirror guiding light incident in the housing through the window to the sensor element 12.

Instead of a mirror guide a lens 66 may be provided which focuses incident light onto the sensor element (FIG. 6b). The lens may be disposed inside the housing or outside of the sensor housing and may form a part of the housing well sealing the sensor housing.

For avoiding signal falsification and image falsification due to reflections on the inner housing wall a shadowing means may be provided on the inner housing wall.

FIGS. 6b and 6c show embodiments in which masks 67, 68 are provided adjacent to the lens in the housing, said masks being disposed in a partly staggered manner to suppress signal reflection inside of the housing as far as possible. The surfaces of the masks are preferably formed so as to absorb radiation. Furthermore, the masks 67, 68 have the function of reducing the interfering influence of sudden changes of the ambient temperature of the output signal of the radiation sensor. To this end the masks are preferably formed of a material having a bad thermal conductivity.

Figure 7:
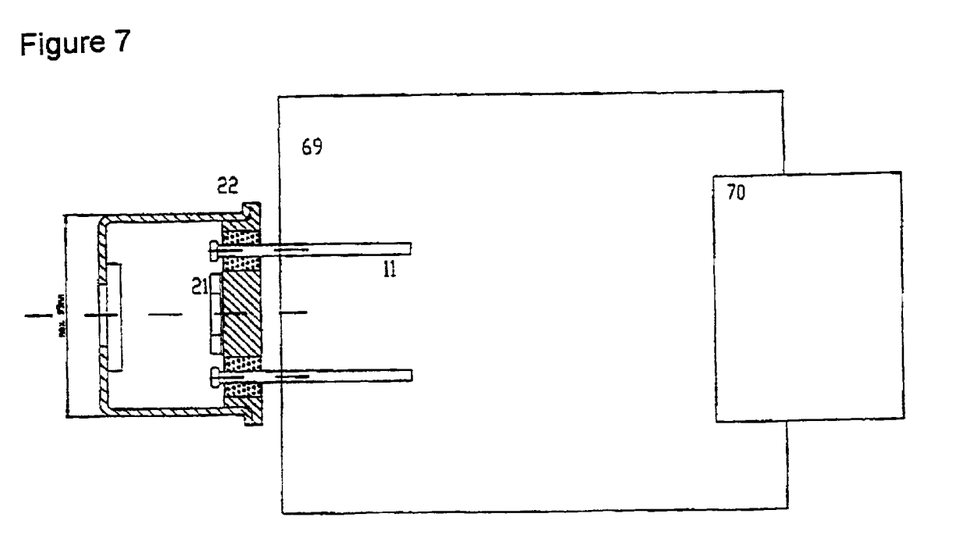
FIG. 7 shows another embodiment of the invention.

FIG. 7 shows an embodiment of the invention comprising a mounted circuit board and a plug for an electric coupling. It is a sensor module as described above, sealed in a cylindrical housing with a cap diameter of maximum 9 mm and mounted on a circuit board, which may be connected to at least three terminals via a plug.

Figure 8A:
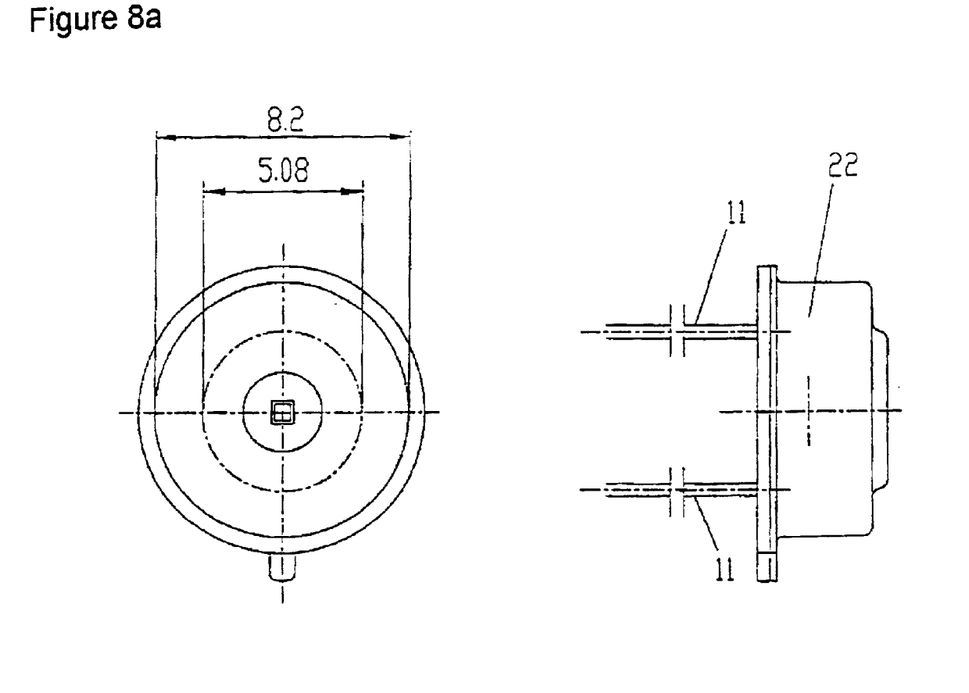
FIGS. 8a, b are illustrations of the typical housing layouts TO5 (FIG. 8a) and TO18 (FIG. 8b).
Figure 8B:
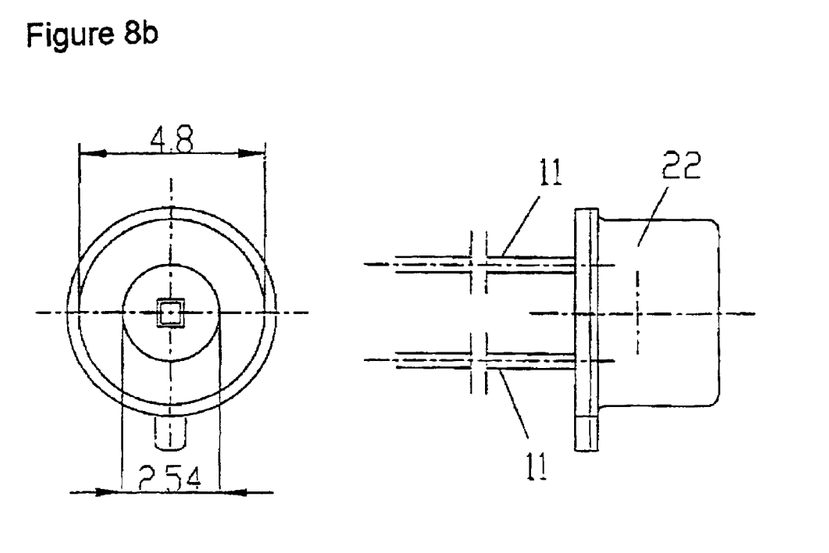

FIG. 8 illustrates embodiments of the TO5 housing (FIG. 8a) and the TO18 housing (FIG. 8b). They are a substantially cylindrical housings, the cylindrical bodies of which have a diameter of about 8.2 mm (TO5) or 4.8 mm (TO18). The terminals 11 are disposed on one of the face sides and distributed over a circle concentric with respect to the cylinder and having a diameter of approximately 5.1 mm (TO5) or 2.5 mm (TO18). The sensor module of the invention may be accommodated in such a housing. It may also be accommodated in a housing having a smaller base than the described TO housings, in which, however, particularly the arrangement of the terminals 11 on the housing is effected in accordance with the TO standards.

The sensor module is particularly applicable to a contact-free temperature measurement. The sensor element 12 and the optical window 63 or the optical imaging means 66 may particularly be designed for the detection of infrared radiation or for letting infrared radiation pass. The infrared radiation is preferably detected by a thermopile sensor.

What is claimed is:

1. Sensor module comprising a radiation-sensitive sensor element providing a radiation-dependent electric output signal, a sensor signal processing circuit receiving the output signal from the sensor element and providing a radiation-dependent first electric signal, a temperature-sensitive reference means comprising a reference element thermally coupled to the sensor element and one or several squaring means connected to the reference element for simulating the temperature dependency of the photo-electric conversion characteristics of the sensor element and providing a temperature-dependent second electric signal, and a combination means for combining the two electric signals, characterised in that the sensor signal processing circuit, the temperature-sensitive reference means and the signal combining means are formed on a single, and the chip and the sensor element are accommodated in a common housing.

2. Sensor module according to claim 1, characterised in that the housing is provided with electrically conductive or semi-conductive walls.

3. Sensor module according to claim 1, characterised in that the housing has a cylindrical shape and the cylinder has a diameter of less than 10 mm.

4. Sensor module according to claim 1, characterised in that the sensor signal processing circuit is provided with a first amplifier.

5. Sensor module according to claim 1, characterised in that the reference means comprises a reference element and a second amplifier.

6. Sensor module according to claim 1, further comprising a compensation means for compensating the influence of the power dissipation of electronic components on the output signal.

7. Sensor module according to claim 1, further comprising a radiation-transmissible window provided in the housing said window being electrically conductive or semi-conductive or having an electrically conductive or semi-conductive coating.

8. Sensor module according to claim 7, further comprising an image element in the window of the housing.

9. Sensor module according to claim 1, further comprising an optical imaging element provided in the housing.

10. Sensor module according to claim 9, characterised in that the imaging element comprises a lens or a mirror.

11. Sensor module according to claim 1, further comprising digital programming means provided in the housing for setting operating parameters of the sensor module.

12. Sensor module according to claim 1, characterised in that the combination means is an integrator amplifier.

13. Sensor module according to claim 1, characterised in that the combination means is a digital circuit receiving the signals from the sensor means and the reference means via A/D converters and outputting a digital, temporally serial signal.

14. Sensor module according to claim 1, characterised in that the combination means is a digital circuit outputting digital signal as YES/NO values to be used for monitoring a temperature threshold or for controlling one or more temperatures to one or more target values, the one or more target values being programmable.

15. The sensor module of claim 1 wherein the reference means comprises elements for characteristics simulation, the elements simulating characteristics of the sensor element with an exponential function or a power function.

16. Sensor module according to claim 1, characterised in that the combination means is a digital circuit outputting digital signal as YES/NO values to be used for monitoring a temperature threshold and for controlling one or more temperatures to one or more target values, the one or more target values being programmable.

* * * * *

UNITED STATES PATENT AND TRADEMARK OFFICE
CERTIFICATE OF CORRECTION

PATENT NO. : 6,921,895 B1
APPLICATION NO. : 09/914083
DATED : July 26, 2005
INVENTOR(S) : Schieferdecker et al.

It is certified that error appears in the above-identified patent and that said Letters Patent is hereby corrected as shown below:

On the title page item (22), should read International Filing Date, February 23, 1999

Signed and Sealed this

Eighteenth Day of July, 2006

JON W. DUDAS
*Director of the United States Patent and Trademark Office*